PRIOR ART

United States Patent Office 3,482,043

Patented Dec. 2, 1969

3,482,043

ROUTE SELECTION AND ESTABLISHMENT AT TELECOMMUNICATION EXCHANGES USING CROSSPOINT SWITCHES

George A. Mathews, Gedling, Nottingham, England, assignor to Ericsson Telephones Limited, Ilford, England, a British company Filed May 11, 1966, Ser. No. 549,410
Claims priority, application Great Britain, June 8, 1965, 24,144/65
Int. Cl. H04m 3/22
U.S. Cl. 179—18 2 Claims

ABSTRACT OF THE DISCLOSURE

An arrangement for route selection and establishment for telecommunication exchanges having A, B, and C stages of crosspoint switches including two-input AND gates corresponding to respective B switches and responsive to the simultaneous availability of AB and BC links to indicate path availability. A B switch selector is operable on the opening of an AND gate to select an open AND gate and to apply an operating potential to the operating lead of the correspondingly selected switch. The operating potential is extended thence over a further contact corresponding to the available AB link associated with the selected open AND gate to be used in operating the crosspoint connecting and AB and BC links in tandem.

Figure 1A:
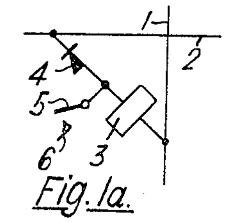
Fig. 1a. PRIOR ART

This invention relates to telecommunication exchanges employing crosspoint switches.

It is known to arrange crosspoint switches in stages and to connect switches of different stages by link, each comprising a control wire, a pair of speech wires and perhaps one or more other wires as may be required. At each crosspoint of a switch, a relay winding is connected between the row and column conductors which define the crosspoint. Each of these conductors is connected to the control wire of a link. Contacts of the relay are disposed between corresponding conductors connected to the other wires of the two links, so that when the relay is energised by current in the control wires, the contacts close and connect the other wires, each to each, of the two links. A further contact connectable in series with the relay winding also closes to indicate that the relay has operated.

It is also known to establish a route through such an exchange by marking the ends of the route, by testing links to see if they are available for use in establishing a route between the marked ends, by marking one or more possible routes each composed of available ones of these links, by selecting one from among these possible, and finally by operating such switches as are necessary to connect together the links composing the selected route. In such a system, a route is selected from among other possible routes before any of the switches are used; the switches are used solely to connect together the component links of a route after the route has been selected.

According to the invention there is provided a telecommunication exchange having A, B and C stages of crosspoint switches, AB links connecting A switches to B switches, BC links connecting B switches to C switches there being one link and one link only between each B switch and each C switch, which includes a two-input AND gate and an operating lead corresponding to each B switch, a test contact corresponding to each link operable to connect a control wire of the link to an input of the gate corresponding to the B switch at which the link terminates, a B switch stepping selector having a step corresponding to each gate directly connected to the output of said gate, the selector being operable on delivery of a gate output signal to select one step at which a gate output signal is being delivered and to apply an operating potential to the operating lead of the B switch represented by the selected step, whereby a route comprising a random connection of an AB link and a BC link is selected from among other available routes on the selection of a switch,.

The selected B switch is also used to establish the selected route. With this arrangement there is an economy of common equipment which results in an exchange which is cheaper than a comparable exchange using known equipment. The arrangement may be employed where A and B switches are provided in groups and the AB links connect only the switches within a group. In such a case, each C switch has a subdivision corresponding to each group, the subdivision being operable independently of each other. The AND gates and operating leads corresponding to B switches in the first group are made common to corresponding B switches in the other groups, so that no increase in the number of AND gates or operating leads is necessary if the number of groups is increased. The arrangement may also be used in connection with a fourth or D stage of switches. It is essential, however, that every B switch should be connected to every C switch by one, but only one link. This requirement imposes an upper limit of about 2000 subscribers to the size of exchange at which the arrangement can be used advantageously.

The test contact of a link is a contact of a relay corresponding to the switch other than the B switch—i.e. the A switch or the C switch—at which the link terminates. The relay operates when the switch is seized and closes the test contacts of all links terminating at the switch. Each of the relays corresponding to an A switch has additionally a further contact for each link terminating at the switch. These contacts are used to connect the row of the B switch at which a particular link terminates to the operating appropriate to the B switch concerned.

The B switch stepping selector may have any suitable electromechanical or electronic construction. When it has selected a B switch by advancing to a step corresponding to the B switch, a relay individual to the B switch is energised. A contact of this relay closes and applies operating potential to the operating lead.

When a call is made at the exchange, an A switch and a C switch are seized, operating the relays corresponding to them. The test contacts of all the links connected to the seized switches then close. If the links are free, input signals are applied to the inputs of the AND gates corresponding to the B switches at which the links terminate. Any gate having two input signals delivers an output signal, indicating a suitable B switch. The selector then advances and selects one of these switches. The relay of the selected switch then operates, closing its contact and applying operating potential over the relevant operating lead. The switch responds and establishes a route by connecting in tandem the free AB and BC links connected to it.

Figure 1B:
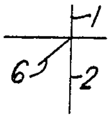
Fig. 1b. PRIOR ART

An embodiment of the invention will now be described with reference to the accompanying drawings in which FIG. 1*a* shows a known type of switch crosspoint FIG. 1*b* shows a drawing convention used in FIGS. 2 and 6 to depict the crosspoint of FIG. 1*a*.

Figure 2:
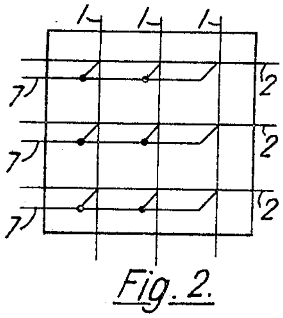

FIG. 2 shows a crosspoint switch using the convention of FIG 1*b*.

Figure 3A:
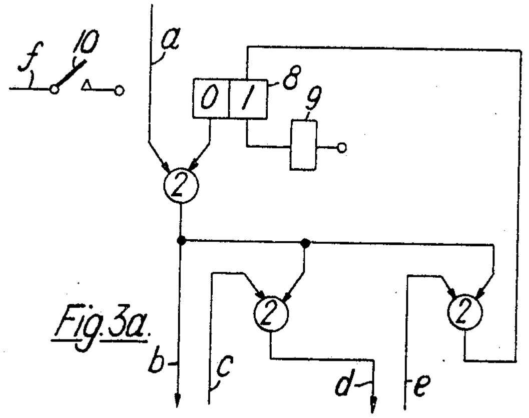

FIG. 3*a* shows a first logic diagram

Figure 3B:
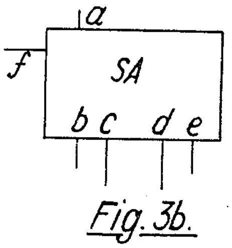

FIG. 3*b* shows a drawing convention used in FIG. 6 to represent the diagram of FIG. 3*a*

Figure 4A:
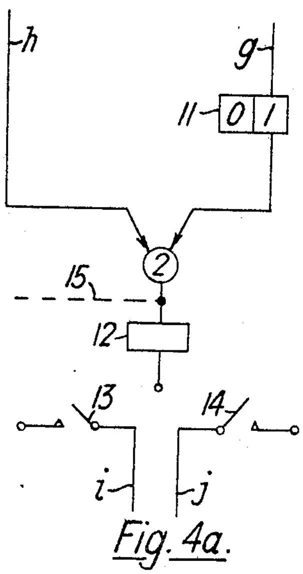

FIG. 4*a* shows a second logic diagram

Figure 4B:
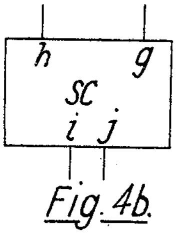

FIG. 4*b* shows a drawing convention used in FIG. 6 to represent the diagram of FIG. 4*a*

Figure 5:
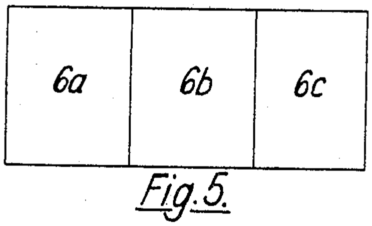
Figure 6A:
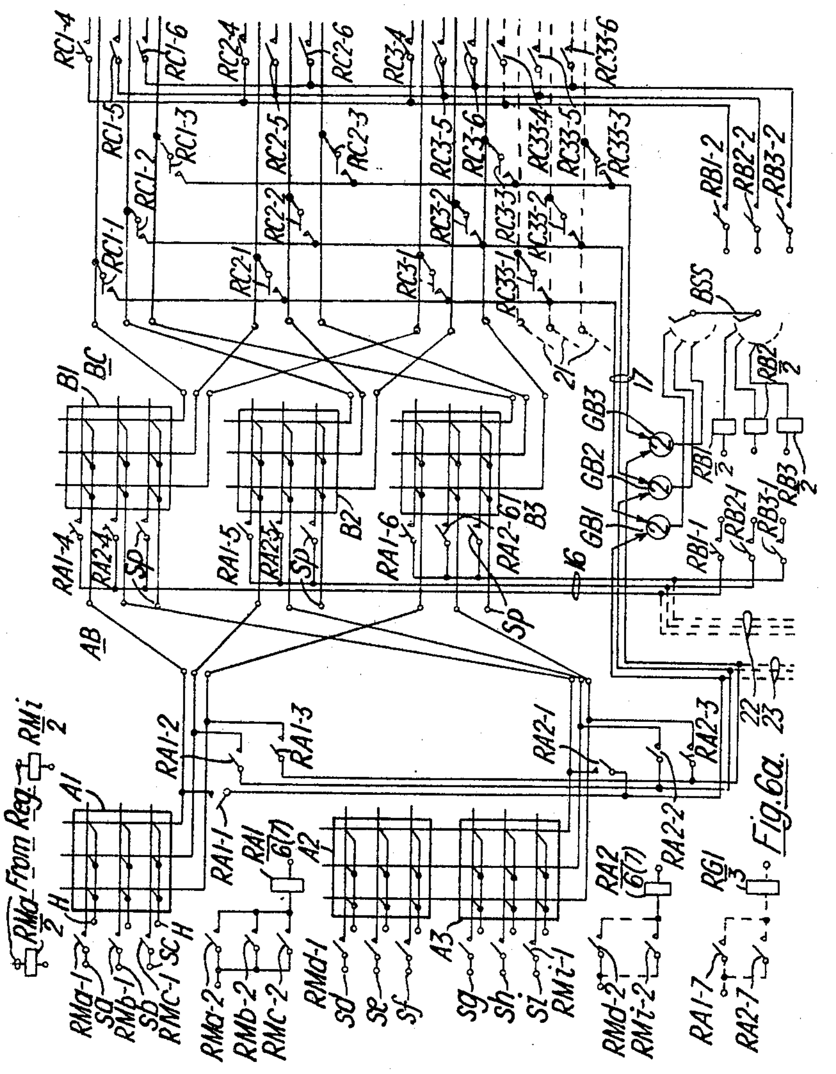
Figure 6B:
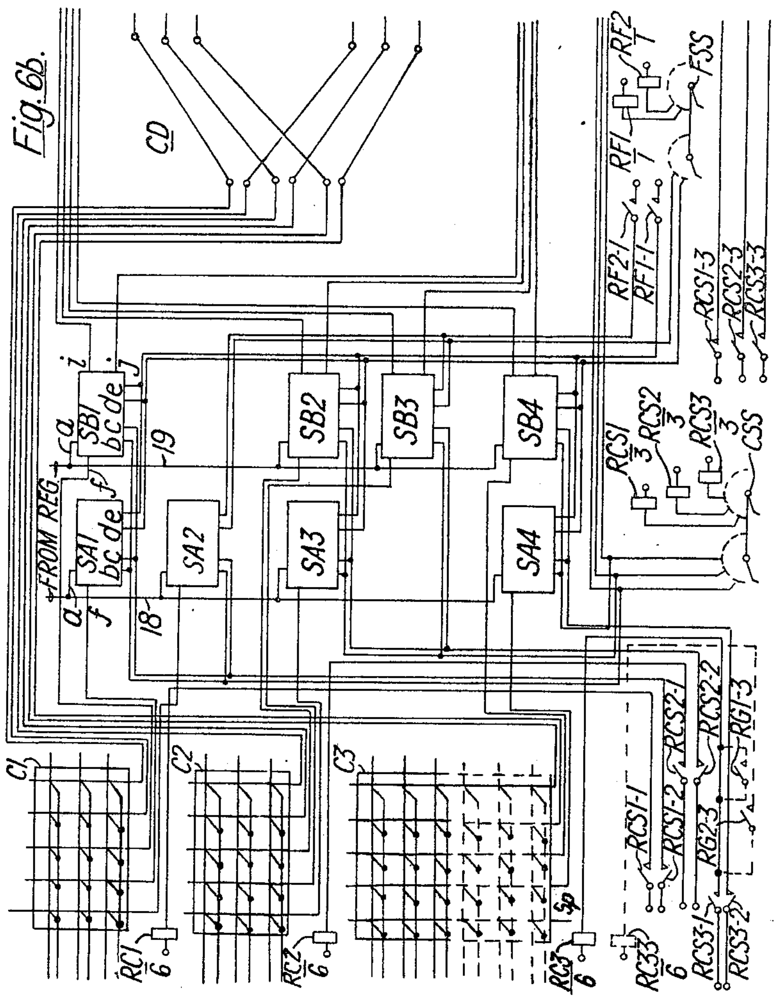
Figure 6C:
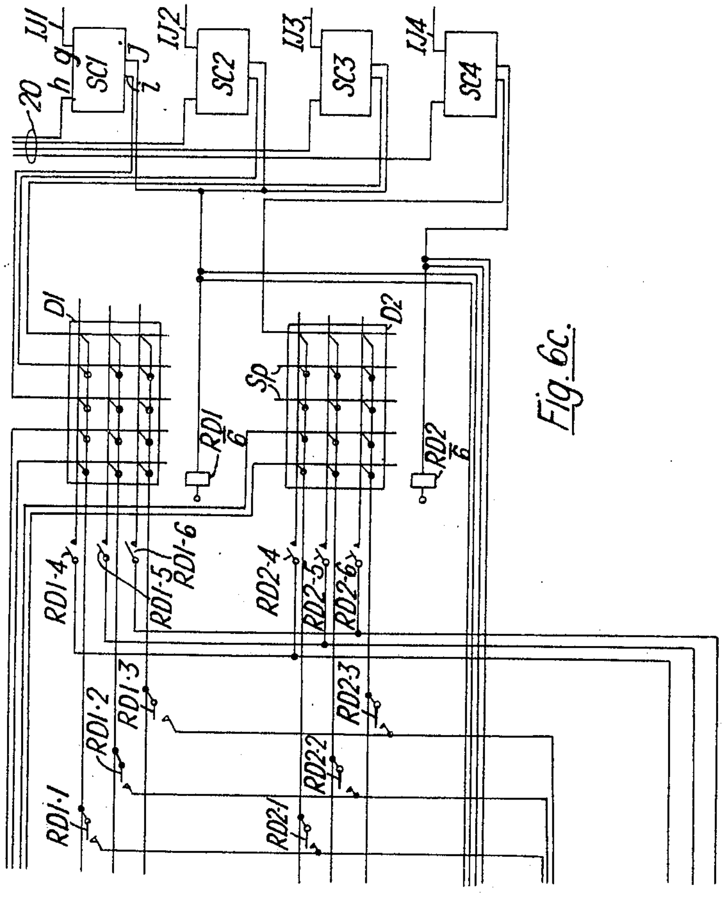

FIG. 5 shows how FIGS. 6*a*, 6*b*, 6*c*, should be arranged, and

FIG. 6 which shows schematically the arrangement of a telephone exchange according to the invention.

In FIG. 1*a* two conductors 1, 2 define a crosspoint, and are connected to each other by a relay winding 3 in series with a rectifier 4. The conductors 1, 2 are each connected to the control wire of a link, and contacts of the relay (not shown) are connected to other wires of the two links. When the relay is energised, these contacts close, and connect the other wires, each to each, of the links. A further contact 5 of the relay is connected to the junctions of the winding 3 and the rectifier 4. When the relay is energised, the contact 5 closes, applying potential to a point 6 which indicates that the relay has operated. The relay may be of the reed-relay type of construction. In FIG. 1*b*, the arrangement of FIG. 1*a* is represented by a drawing convention in which only the conductors 1, 2 and the indication point 6 are shown.

FIG. 2 shows, using the convention of FIG. 1*b*, a crosspoint switch having three row conductors and three column conductors. Any row conductor can be connected to any column conductor by operating the relay at their mutual crosspoint. The indication outlets are commoned on a row basis as shown at 7. It is known to connect the common wires 7 to column conductors of other switches, so that after a crosspoint in one switch has operated, the relevant wire 7 applies a potential to the column wire of another switch. When a crosspoint in the second switch has operated, the appropriate wire 7 of the second switch also delivers a potential. This potential may be employed to hold in their energised condition the relays at the two crosspoints in question, the windings being connected in series with each other between the appropriate wire 7 of the second switch and one of the columns 1 of the first switch. A hold circuit of this nature may be established over more than two switches.

FIG. 3*a* shows schematically a logic circuit used in selecting individual supervisory sets of a type A. Each set has a flip flop 8 whose "0" side delivers an output while the set is free. A signal indicating that a supervisory set is required is applied to terminal *a*, and if the set is free, an "available" signal is delivered at terminal *b*. If a return signal is received at terminal *c*, a further signal is delivered at terminal *d*. If then a seizure signal is received at terminal *e*, the flip-flop 8 is changed over, and a relay 9 is operated. A contact 10 of this relay then closes to deliver a signal at terminal *f*. The design of a suitable circuit to meet these requirements is within the competence of one skilled in the art, and does not form part of the present invention. FIG. 3*b* shows a drawing convention adopted to depict these arrangements.

FIG. 4*a* is a logic liagram showing schematically how a supervisory set of a type B may be seized by a seizure signal received at a terminal *g*. This signal changes a flip flop to its "1" state, denoting seizure, and if a confirmatory signal is then received at a terminal *h*, a relay 12 is operated whose contacts 13, 14 close to apply signals to terminals *i*, *j* respectively. Alternatively the relay 12 may be operated by a single signal applied over the lead 15. The design of a suitable circuit to meet these requirements is within the competence of one skilled in the art, and does not form part of the present invention. FIG. 4*b* shows a drawing convention adapted to depict these arrangements.

Referring now to FIGS. 6*a*–6*c*, there are shown only the control wires of the links and of the switch rows and columns, the speech, private and otherwise (if any) being omitted. The switch sizes and numbers are chosen for ease of explanation and do not represent quantities likely to be met in practice. There are shown three stages of switches A, B, C and an optional fourth stage D. The stages are interconnected by links AB, BC and CD if D switches are used. Subscribers lines *sa*–*si* are connected to row conductors of A stage switches A1–A3. Supervisory sets of two types, A, B, usable on calls originating at the exchange, and denoted by SA, SB followed by a number, are connected to individual column conductors of the C stage switches C1–C3. Supervisory sets of a third type, denoted by SC and an identifying number and useable on calls incoming to the exchange, are preferably connected to individual column wires of the D stage switches D1, D2. In the absence of D switches the sets are connected to columns of the C switches. The supervisory sets may have any suitable electromechanical or electronic construction suitable for establishing the connections for which they are required. As will be explained later, the sets must also be capable of performing the requisite logic functions mentioned in connection with FIGS. 3*a*, 4*a*.

The exchange has a register (not shown) operating on established principles and not forming part of the present invention. Each subscriber has a marker relay (e.g. RM*a* for subscriber *sa*) operable in response to marking potential applied to it by the register. One contact of this relay applies a potential to the control wire of the A switch row to which the line is connected. The other operates a relay corresponding to the A switch concerned (e.g. relay RA1 corresponding to switch A1). The commoned row outlets of the A switch are connected at terminals H to a source of potential which may be used to hold an established connection. The A switch column conductors are connected to AB links. The AB links may be exclusive to one A switch as shown for switch A1, or they may be shared in common by two or more switches A2, A3, in which case the sharing switches have their column conductors connected each to each. One relay only (e.g. RA2) is required for any number of sharing switches.

The A switch relays have a test contact (e.g. RA1–1, RA1–2, RA1–3) for each AB link to which the A switch has access. Each relay also has a further contact (e.g. RA1–4, RA1–5, RA1–6) at the B switch end of each link connected in series with the row conductor of the B switch row at which the link terminates.

The B switch column conductors are connected to BC links. There is one and only one BC link connecting any B switch to any C switch. (The dotted portion of switch C3 will be considered later in connection with exchange growth.) There is a relay corresponding to each C switch, (e.g. relay RC1 corresponding to switch C1). The C switch relays have a test contact (e.g. RC1–1, RC1–2, RC1–3) for each BC link to which the C switch has access. Each relay also has a further contact (e.g. RC1–4, RC1–5, RC1–6), at the C switch end of each link connected in series with the row conductor of the C switch row at which the link terminates.

There is a two input AND gate corresponding to each B switch (e.g. gate GB1 corresponding to switch B1). Test contacts (RA1–1, RA2–1) for AB links terminating at switch B1 are connected to one input of gate GB1. Test contacts (RC1–1, RC2–1, RC3–1) for BC links terminating at switch B1 are connected to the other input of gate GB1. The gates for the other B switches are connected correspondingly. There is one gate for each B switch but the number of B switches is not necessarily limited to three.

A B switch stepping selector BSS, of any suitable electronic or electromagnetic construction, has a step corresponding to each B switch. The outlet from the gate corresponding to a B switch is connected to the step corresponding to the B switch (e.g. the outlet from gate GB1 corresponding to switch B1 is connected to the first step of the selector BSS). Each B switch also has a relay connected to the appropriate step of the selector (e.g. relay RB1 corresponding to switch B1 is also connected to the first step of the selector). The relay of a B switch has two contacts. One (e.g. RB1–1) enables operating potential to be applied over operating leads 16 to the row conductors of the B switch (e.g. B1). The other (e.g. RB1–2) enables a similar potential to be applied over similar leads 17 to the C switch row conductors at which BC links from the B switch are terminated (e.g. considering the switch B1, contact RB1–2 enables potential to be applied to the first row conductor of each C switch).

When a call is originated at the exchange, information is signalled from the calling subscriber to the register in known manner. The register then delivers a marking potential which operates the marking relay of the calling subscriber. Assuring that the call originated from subscriber *sa*, the relay RM*a* is operated. Contact RM*a*–1 closes and extends the calling line *sa* to the first row conductor of switch A1. Contact RM*a*–2 closes to operate relay RA1 (whose seventh contact will be considered later in connection with exchange growth). The test contacts RA1–1, RA1–2, RA1–3 close, one contact being connected to each of the three AB links terminating at switch A1. When a link is free, a potential is present in its control wire. When the test contact for this link closes, this potential is applied as an input to the gate corresponding to the B switch at which the link terminates. For example, if all three AB links leading from switch A1 are free, the closing of test contacts RA1–1, RA1–2, RA1–3 causes input to be applied respectively to the gates GB1, GB2, GB3. Contacts RA1–4, RA1–5, RA1–6 also close. Each connects an operating lead 16 to the row conductor of a B switch at which one of the three AB links terminate.

The register then causes (by means to be described later) a supervisory set of the required type and the C switch connected thereto to be selected. Suppose the set SA1 and switch C1 are selected. In a manner to be explained later, the selection of a C switch is indicated by the operation of the relevant C switch relay (RC1 in the present case). With relay RC1 operated, the test contacts RC1–1, RC1–2, RC1–3 are closed. In respect of the BC links terminating at switch C1 which are free potential is applied over these contacts and relevant ones of the leads 17 to the inputs of the relevant ones of the gates GB1, GB2, GB3. For example, if the BC link connecting switches B1, C1 is free, potential is applied over test contact RC1–1 as an input to the gate GB1. And if the gate GB1 already has an input applied to it in respect of an AB link terminating at switch B1, the gate GB1 will open. But before considering this, it must be appreciated that contacts RC1–4, RC1–5, RC1–6 also close.

Now if all three AB links and all three BC links so far considered are free, each of the gates GB1, GB2, GB3 has two inputs applied to it, and therefore opens and delivers an output signal. If any of these six links is engaged, the closing of the test contact applicable thereto fails to apply potential to the input of the relevant gate, and the gate fails to open. For example, if the BC link between switches B2 and C1 is engaged, the closing of test contact RC1–2 does not result in an input being applied to gate GB2, which therefore fails to open. But if all the six links are free, all these gates open, each gate applying its output signal to the corresponding step of the B switch selector BSS.

The B switch selector starts to step on the receipt of an output signal from any gate, and continues stepping until it reaches a step to which a gate output signal is being applied. When it reaches such a step, the relay of the B switch corresponding to the step is operated. In the present case, the selector stops on the first step, operating relay RB1, whose contacts close.

With contacts RB1–4 and RA1–4 closed, potential is applied to the conductor in switch C1 of the row to which the link to switch B1 is connected. Potential is already being applied from the selected supervisory set SA1 to a column conductor of the switch C1. The relay at their mutual crosspoint is therefore operated, and a signal is applied over the commoned row wire from this crosspoint, and the BC link between switches B1, C1, to one of the columns of the switch B1.

With contacts RB1–1 and RA1–4 closed, potential is applied in the switch B1 to the conductor of the row to which is connected the AB link leading to the desired A switch. The relay at the relevant crosspoint is now operated, and a signal is applied over the commoned row wire from this crosspoint and the AB link between the switches A1, B1 to one of the columns of the switch A1.

At the crosspoint where this column crosses the row conductor of the calling line *sa*, the relay is operated, and the control wire circuit is extended from this point over the commoned row wire to a source of holding potential at terminal H. The desired connection has now been established.

The supervisory set SA1 and switch C1 were selected in the following way. A signal from the register was applied over lead 18 to all sets of the type A at terminal *a*. Those sets that were free then delivered a corresponding signal at terminal *b* as discussed in connection with FIG. 3*a*. The terminals *b* are connected to the steps of a C switch stepping selector CSS in accordance with which C switch is connected to terminal *f* of the set. For example, set SA1 has its terminal *f* connected to a column of switch C1; terminal *b* is therefore connected to the first step of the C switch selector CSS. The selector starts to step on receipt of a signal from any terminal *b*, and stops when it reaches a step to which a signal is being applied. A relay individual to each C switch is connected to a step of the selector in accordance with which C switch is connected to the supervisory set associated with the step. For example, the supervisory set SA1 already mentioned is connected to the switch C1 and to the first step of the selector CSS; the relay RCS1 individual to the switch C1 is therefore also connected to the first step of the selector CSS. In the present case, the selector CSS stops at its first step, and relay RCS1 is operated. The relay RC1 corresponding to switch C1 operates in series with contact RC1–1. Contact RCS1–2 causes a return signal to be delivered to terminal *c* of the supervisory sets (SA1, SA2, SB1) of any type connected to switch C1. Contact RCS1–3 may be ignored meantime. Those A-type sets which are free (say SA1, SA2) deliver a further signal at their terminals *d* which are applied to the steps of a supervisory set stopping selector FSS. Signals from first-choice sets are connected to the first step, second-choice sets to the second step and so on. Each step has a relay individual thereto. The supervisory set selector FSS steps in response to a signal received from a free supervisory set, and stops when it reaches a step with a signal applied to it. In the present case, signals from sets SA1, SA2 are applied to the first and second steps respectively; the selector FSS stops on the first step and relay RF1 is operated. Contact RF1–1 closes to deliver a signal at terminal *e* of all first choice relay sets (of any type). At set SA1 this signal is effective to operate flip flop 8 and relay 9 (FIG. 3*a*) which closes contact 10 and applies a potential to terminal *f*. This potential is conveyed to a column conductor of switch C1 where it is used as already described. At this stage, the set SA1 returns a signal to the register, causing the initial signal on lead 18 to be terminated.

For calls between two subscribers on the exchange the simplest arrangement is to carry out the procedure just described, and then to establish, in similar manner, a connection to the called subscriber from the supervisory set already in use. For a call incoming to the exchange, the supervisory set tied to an incoming junction is used, and a connection is established, again in similar manner, thence to the called subscriber. A disadvantage of this arrangement is that in establishing the connection to the called subscriber, the choice of BC links is limited to those terminating at one C switch. To improve the range of choice, a fourth or D switching stage may be provided for use on incoming and subscriber-to-subscriber calls, as will now be discussed.

Junctions IJ1–IJ4 incoming to the exchange terminate on individual supervisory sets SC1–SC4. These sets have any suitable electronic or electromagnetic construction, and in addition are capable of fulfilling the logic requirements considered in connection with FIG. 4*a*. Their terminals *i, j* are connected respectively to a column conductor of a D switch and the relay of the same switch. For example, terminal *i* of set SC1 is connected to a column conductor of switch D1, and its terminal *j* to the relay RD1. Any convenient number of D switches may be provided. Their row conductors are connected by means of CD links to column conductors of C switches. Each CD link has its test contact operated by the relay of the D switch at which the link terminates, this contact being connected to a step of the C switch stepping selector CSS in accordance with the C switch at which the link terminates. For example, the CD link betweeen switches C2 and D1 has its test contact RD1–2 connected to the second step of the selector CSS. Thus contacts RD1–1, RD1–2, RD1–3 of the relay RD are test contacts. Its contacts RD1–4, RD1–5, RD1–6 are each connected to a row conductor of the switch D1 and to a contact of the step relay of the C switch selector CSS, the relay corresponding to the C switch at which the CD link from the row in question is terminated. For example, in the case of the CD link between switches C2 and D1, the contact RD1–5 is connected to the second row conductor of the switch D1, and to the contact RCS2–3 of the second step relay RCS2.

For calls between subscribers on the exchange, supervisory sets SB are provided. These have any suitable electronic or electromagnetic construction. Additionally, each set is capable of performing the logic functions discussed in connection with FIGS. 3*a* and 4*a*, though it is generally more convenient in these sets to use a single signal applied to lead 15 of FIG. 4*a* than a combination of signals applied to terminals *g* and *h*. Terminals *a* of the SB sets are connected to a lead 19 from the register, each terminal *f* being connected to a C switch column conductor. Terminals *b, c, d, e,* are connected to steps of the C switch selector CSS and of the supervisory set selectors FSS in the manner described for the SA sets. Terminals *i, j* are connected respectively to D switch column conductors and to corresponding D switch relays in the manner described for the SC sets.

If an incoming call is received on incoming junction IJ1, supervisory set SC1—which is tied thereto—is marked engaged by a signal applied to its terminal *g*. At the same time, by known means (not shown), the junction is connected to the register which registers the incombing information. At a suitable juncture, the register marks the called subscriber in the manner already described for a calling subscriber. At the same time, a signal is applied to terminal *h* of the set SC1. This signal may be transmitted over the appropriate one of the leads 20, or it may be transmitted over the path by which the register received the incoming information from the junction.

The set SC1 now delivers signals at its terminals *i, j*. The former applies potential to a column conductor of the switch D1. The latter operates relay RD1. The test contacts RD1–1, RD1–2, RD1–3 close and apply potential, in respect of free CD links, to steps of the C switch selector CSS. The selector steps and selects a C switch by stopping at a step at which a signal is being delivered. For example, supposing the CD link between switches C1, D1 is free, the C switch selector CSS stops at its first step, thereby selecting the switch C1 and operating the relay RCS1. Relay RC1 then operates in series with contact RCS1–1. Contact RCS1–2 closes, but is ineffective in the absence of a signal on either of leads 18, 19. Consequently the selector FSS, which selects one from a number of free supervisory sets, is not brought into play; indeed it could serve no useful purpose, because the set SC1, being tied to junction IJ1, was selected when the junction was selected. Contact RCS1–3 closes, and, with contact RD1–4 already closed, applies potential to the first row conductor of switch D1. At the crosspoint of this row with the column conductor connected to the set SC1, the relay now operates, extending potential over the commoned row wire, the CD link in series therewith to a column conductor of the selected switch C1, whose relay RC1 has already been operated.

The connection from switch C1 to the marked (called) subscriber is next established in the manner already described in connection with a calling subscriber.

For a call between two subscribers on the exchange, a supervisory set SB of type B is used. A free SB set is selected (using both the C switch selector CSS and the supervisory set selector FSS in the manner described for an SA set) in response to a signal from the register over lead 19. The selected SB set is then connected to the calling line in the manner already described in connection with an SA set. When connection to the calling subscriber has been established, a signal is received from the register which (preferably by being applied to lead 15 of FIG. 4*a*) causes signals to be delivered at terminals *i, j* of the SB set. The SB set may now be regarded as an SC set, connection to the called subscriber being established in the same manner as for an incoming call, i.e. from the SB set, through D, C, B and A switches to the called line.

Growth is absorbed initially by using spare rows and columns, S*p*, of switches already in use. Further growth is met by providing one or more further groups of A and B switches. AB links connect A and B switches within each group, but do not connect the switches of different groups. For each additional group, each C switch is provided with a sub-division. One such subdivision is shown, as a typical example, in broken lines, for the switch C3. The BC links from switch C3 to the existing B switches remain undisturbed. But the switch C3 must be connected to each B switch in the new group. For this purpose, new BC links are provided as shown at 21, and the switch C3 is provided with an additional row for each such link. In the drawing, three new BC links are shown, requiring three additional rows in the switch C3. The three additional rows are served by an additional relay RC33, the additional rows and relay constituting the new subdivisions of the switch C3. Contacts of the new relay RC33 are arranged in similar manner to those of the relay RC3.

As will be more fully considered later, originating calls are established within any group in the manner already described. However, when setting up a connection to a called subscriber it is necessary to provide for selective operation of the relays of a subdivided C switch, so that a BC link leading to a B switch in the group appropriate to the called subscriber may be selected. This requirement is met by providing the A switch relays with an additional contact (e.g. RA1–7) and by providing a group relay for each switch group (e.g. relay RG1 for the first group and RG2 (not shown) for the second or new group) which is energised over the additional contact of the relevant A switch relay when any A switch within the group is required. These group relays have a contact corresponding to each C switch, though only those corresponding to switch C3 are shown in the drawing. These contacts are placed between the appropriate contact of a step relay of the C switch selector and the relay rotating to a relevant subdivision of a C switch. For example, in the arrangement previously described, the relay RC3 of the switch C3 is connected in series with contact RCS3–1. When the new group is added, contact RG1–3 of the first group relay RG1 is interposed between contact RCS3–1 and relay RC3. Contact RG2–3 of the second group relay RG2 (not shown) is included in a new connection between contact RC3–1 and the new relay RC33. Thus relay RC3 is only energised when an A switch in the first group is required and relay RC33 when an A switch in the second group is required. Although the drawing only shows the switch C3 as being subdivided, it must be made clear that, when the second switch group is added, each of the C switches is similarly subdivided. Thus contacts RG1–1, RG2–1 and RG1–2, RG2–2 are connected respectively to contacts RCS1–1 and RCS2–1 in a manner similar to that described in connection with contact RCS3–1.

The selection of a B switch in the second or any other additional group is performed by the B switch selector BSS already provided for the first group. No additional coincidence gates or B switch relays are necessary. The new B switches are arranged to correspond with the old B switches, and relay RB1 which relates to switch B1 of the first group is also made to relate to switch B1 of the second group, and similarly for the other switches. This is achieved by tappings 22 from the B switch operating leads 16. The B switches in the two groups having been arranged to correspond to each other, it follows that the gates GB1, GB2, GB3 may be made to relate to the switches B1, B2, B3 of both groups. Therefore the test contacts of the new AB links are connected as shown at 23 to the gate input terminals in accordance with the B switches in the second group at which the new links terminate.

To supplement the foregoing decsription, a call from incoming junction IP4 to a subscribed sh (not shown) connected to switch A1 of the second group (not shown) will now be considered. After receiving the necessary information, the register marks the wanted line and sends a signal over the relevant lead 20 to the supervisory set SC4.

The marking condition operates relay RM*h* (not shown) followed by switch relay RA1 (second group—not shown) and group relay RG2 (second group—not shown). The test contacts of the relevant AB links in the second group close, and, in respect of those links which are free, inputs are applied over lead 23 to the gates corresponding to the B switches at which the free links terminate. With relay RG2 operated, its contact RG2–3 is closed.

At the set SC4 the signal from the register causes a further signal at terminal *j*, which operates relay RD2, closing the test contacts RD2–1, RD2–2, RD2–3, and starting the C switch selector CSS. Suppose switch C3 is selected. Then relay RCS3 operates. Contact RCS3–1 closes, and, since contact RG2–3 is already closed, operates relay RC33. Contact RCS3–3 also closes and, since contact RD2–6 is already closed, operates the relay at the bottom right hand cross point of the switch D2.

Potential is therefore applied over the bottom commoned row wire of switch D2, the bottom CD link to the fourth column of switch C3.

But with relay RC33 having been operated, potential in respect of any free BC links 21 is applied over leads 17 as inputs to the gates corresponding to the B switches at which the links 21 terminate. Suppose the gate GB2 opens and the selector BSS stops at its second step. Relay RB2 operates. Contact RB2–1 closes and applies operating potential to the B switch operating leads 16, 22. The former is ineffective because no A switch relay of the first group has operated, and all their contacts are open. The latter causes operating potential to be applied to the relevant row conductor of switch B2 of the second group. Contact RB2–2 also closes and, since contact RC33–5 is already closed, applies potential to the fifth row conductor of switch C3.

The relay at the crosspoint with the fourth column now operates, applying potential over the commoned row wire and the middle one of the new BC links 21 to switch B2

(not shown) of the second group. The relevant crosspoint relay of switch B2 now operates. Applying potential over one of the new AB links to switch A1 (not shown) of the new group. The relevant crosspoint relay in this switch now operates, effecting connection to the wanted line *sh* (not shown).

What we claim is:

1. A telecommunication exchange comprising A, B and C stages of crosspoint switches; AB links connecting A switches to B switches, each link terminating at a row of a B switch; BC links connecting B switches to C switches, each link terminating at a column of a B switch, there being one BC link and one link only between each B switch and each C switch; two-input AND gates; an operating lead corresponding to each B switch, each gate having a first input to which a first input signal is applicable when an AB link terminating at the relevant B switch is free and a second input to which a second input signal is applicable when a BC link terminating at the said B switch is free; a test contact corresponding to each link operable when a call is to be established in the exchange to apply a first or second input signal to the appropriate input of the gate corresponding to the B switch to which the link to which the contact corresponds is connected provided the said link is free; a further contact corresponding to each AB link operable in conjunction with the test contact for the relevant link, each said further contact being operable to effect a connection between the operating lead of the B switch to which the relevant AB link is connected and crosspoints in the row of said switch at which the said link is terminated; and a B switch selector operable on the opening of an AND gate in response to coincident application of first and second input signals to select an open AND gate and thereby the B switch to which the selected gate corresponds and to apply an operating potential to the operating lead for the selected switch, the operating potential being extended thence over that one of said further contacts which corresponds to the AB link from which the first input signal was applied to the selected open AND gate to co-operate with free potential applied to the relevant column direct from the BC link whence the second input signal was applied to the said gate, the free and operating potentials together operating the crosspoint of said row and said column to connect said AB link in tandem.

2. An exchange as claimed in claim 1 which includes a D switching stage useable on subscriber-to-subscriber calls and on calls incoming to the exchange; CD links connecting D switches to C switches; and a C switch selector responsive to the selection of a D switch to select a C switch, the selection of a route from a selected C switch to an A switch being made on the selection of a B switch by the B switch selector.

References Cited

UNITED STATES PATENTS 3,324,249 6/1967 Cotroneo et al.
3,342,947 9/1967 Bock.

KATHLEEN H. CLAFFY, Primary Examiner

W. A. HELVESTINE, Assistant Examiner